United States Patent [19]

Schmid

[11] 4,384,860
[45] May 24, 1983

[54] THREE-ROLLER UNIVERSAL JOINT

[76] Inventor: Leopold F. Schmid, Leharstr. 8/9 O.G., 7000 Stuttgart 1, Fed. Rep. of Germany

[21] Appl. No.: 227,320

[22] Filed: Jan. 22, 1981

[51] Int. Cl.³ .............................................. F16D 3/22
[52] U.S. Cl. .................................... 464/111; 464/124; 464/905
[58] Field of Search ................ 464/111, 122, 124, 905

[56] References Cited

U.S. PATENT DOCUMENTS

| 3,381,497 | 5/1968 | Allen | 464/122 |
| 3,930,378 | 1/1976 | Schmid | 64/8 |

FOREIGN PATENT DOCUMENTS

| 2039965 | 2/1972 | Fed. Rep. of Germany | 64/21 |
| 2216345 | 11/1972 | Fed. Rep. of Germany | |
| 2225499 | 4/1974 | Fed. Rep. of Germany | |
| 2355765 | 5/1975 | Fed. Rep. of Germany | 64/21 |
| 2355823 | 5/1975 | Fed. Rep. of Germany | 64/8 |
| 2558059 | 1/1977 | Fed. Rep. of Germany | 64/21 |
| 2302449 | 9/1976 | France | 464/111 |
| 194487 | 6/1967 | U.S.S.R. | 64/21 |

Primary Examiner—Stuart S. Levy
Assistant Examiner—Daniel P. Stodola
Attorney, Agent, or Firm—Flynn, Thiel, Boutell & Tanis

[57] ABSTRACT

A constant velocity universal joint has an outer female or track part having three grooves within it running in its axial direction. Within the female part the trunnion part is placed which is designed with three rollers which, like the grooves, are equally spaced in angle about the joint's axis, and they are keyingly taken up in the grooves. The rollers are generally mushroom-like and their heads are designed for making rolling contact against sides of the grooves, while their radial stems take the form of turnpins for turningly supporting the rollers in the male joint half. The outer faces of the mushroom-like rollers are spherical and centered on the middle of the joint when the joint halves are in the in-line position. The radially inner ends of the rollers are flat and between them a ball or cylindrical body is placed for positively keeping the outer spherical faces of the rollers against narrow lands (running in the axial direction of the joint) on the floors of the three grooves.

8 Claims, 6 Drawing Figures

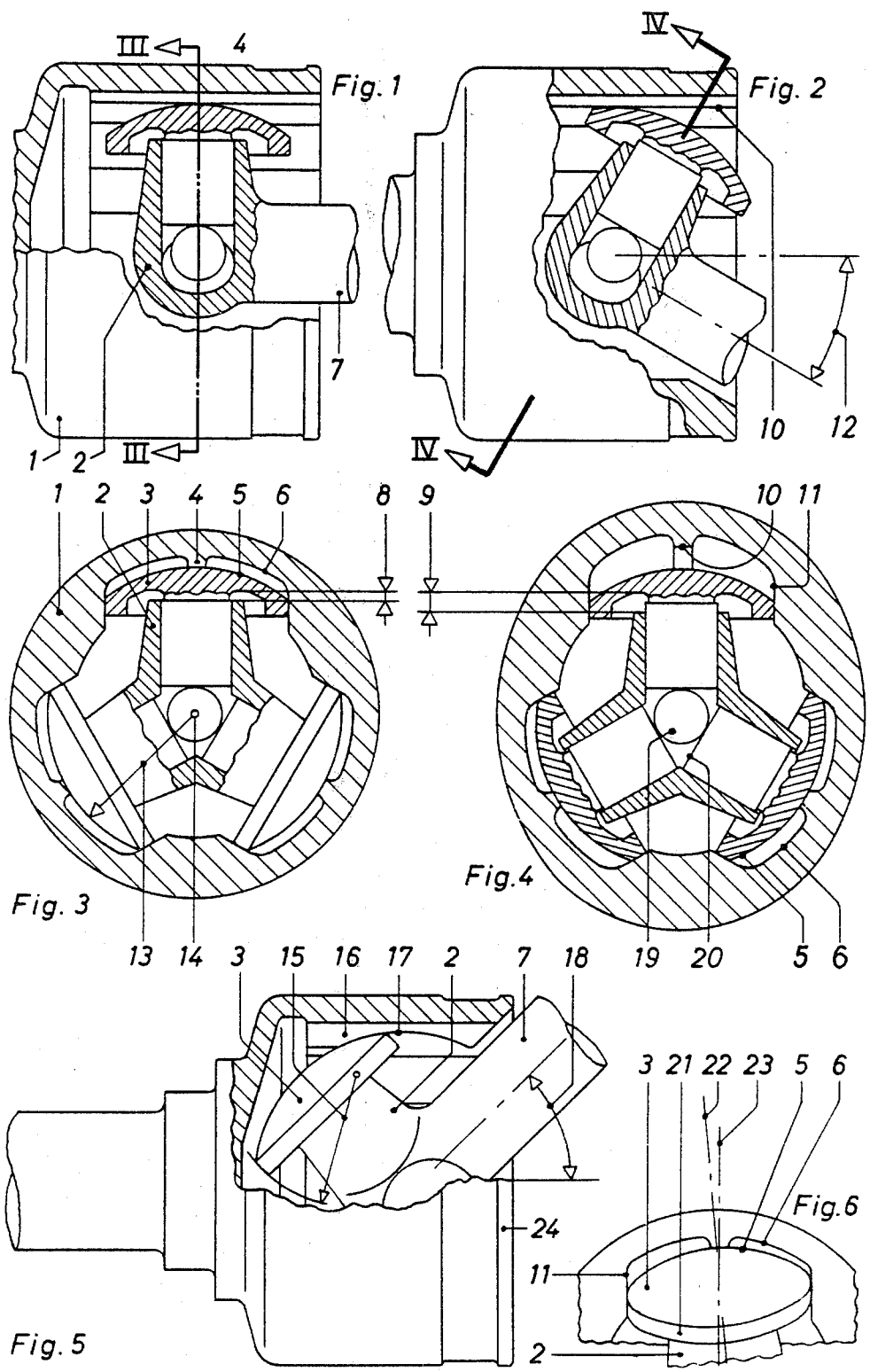

THREE-ROLLER UNIVERSAL JOINT

BACKGROUND OF THE INVENTION (i) Field which invention relates to

The present invention is with respect to a three-roller universal joint with a system for positive guiding of the three rollers used for the torque or driving force, in the case of which for causing the radial change in position of the rollers in relation to the male, inner part of the joint, use is made of spherical running or controlling faces on the rollers, which by way of a controlling part, placed in the middle of the joint and acting on all three rollers at the same time, are each kept against an opposite controlling or running face of the outer or female joint part, such opposite controlling faces being positioned in each case at the floor of one of three grooves, parallel to the axis of turning of the joint, for the three rollers transmitting the driving force.

(ii) The prior art

In the first design of such a three-roller universal joint, see U.S. Pat. No. 2,910,845, use was only made of centrifugal force for keeping the three torque-transmitting rollers, which have a spherical face, against the floors of the grooves in which they are placed, such centrifugal force further controlling radial motion of such rollers in relation to the inner or male joint half.

The first positive controlling or confining system for the three rollers of such a joint was set forth in French Pat. No. 1,272,530, which is generally based on the idea of having the grooves of the outer or female joint half, and which take up the three driving rollers, designed so as to be placed round the spherical faces of the rollers, on the two sides of their turnpins, so as to give a cage-like structure making certain of positive control and guiding of the rollers' radial motion in relation to the male inner or core joint half.

A positive guiding system for the three rollers or balls of a three-unit joint using a driving part placed in the middle of the joint for acting on all three rollers or balls at the same time is to be seen in German Auslegeschrift specification No. 2,225,499, this patent marking the start of a line of development which was responsible for a number of patent applications for positive guiding or controlling systems with a controlling part placed in the middle of the joint. German Offenlegungsschrift specification No. 2,355,765 may be noted in this respect as representative of this branch of development in the universal joint art.

To give a balanced account of the prior art, German Offenlegungsschrift specification No. 2,216,345 is lastly to be noted whose three-unit universal joint has a middle, floatingly positioned ring part acting on the three rollers, used for torque-transmission, at the same time by way of a flat running face. However, in the case of this prior art design it is not a question of a positive controlling or confining system, because in this case the ring part or annulus is not able to be a stiff or rigid body, and in fact has to be a giving spring structure, able to undergo a change in form and having a low springing force.

All three roller or three ball universal joints, in some cases named "tripod joints", have the design-based shortcoming of a great size of the motion of the three torque-transmitting rollers in relation to the inner or male joint half because, when the two joint halves are not in time, the rollers or the like have to be moved radially between two limits of motion on each turn of the joint structure. At one of these limits of motion or extreme positions the roller comes nearer to the inner or core joint half by a certain degree, while in the other limit of its motion it is moved by three times this amount away from the middle of the joint. These amounts of motion are roughly equal to the square of the angle by which the joint halves are out of line. In the case of a three-roller joint, designed for an upper limit of the rated torque of 150 mkp, there will be a motion of about 3 mm radially outwards of each roller even when the joint halves are only 20° out of line, that is to say when the two shafts are angulated by 20°. Because three-roller joints are mostly used for universal joint shafts for driving the wheels of motor vehicles, and because in the case of front wheel driving system the joint halves may be up to 47° out of line, in the case of present-day designs relative motions of up to 15 mm may be produced. Three-roller universal joints have however furthermore so far the design-based shortcoming that, when the two halves are running out of line, the middle of the inner joint half is eccentrically moved out of position in relation to the middle of the outer or female joint half, and because of the oscillating motion produced there will be a further increase in the noise and out-of-balance condition, which in any case will be caused by the radial motion of the three rollers.

SUMMARY OF THE INVENTION

One purpose of the present invention is that of making such a further development and better design of a three-roller universal joint with positive control of the sort noted for the three torque-transmitting rollers that the shortcomings which have been outlined in the present specification and which are caused by the general design system of such joints, are greatly decreased so that undesired effects caused thereby with respect to noise, out-of-balance conditions, heating up, wear and efficiency are taken care of.

For effecting this purpose and other purposes the spherical guiding faces are centered, in the in-line of the two joint halves, at the middle of the joint and the opposite guiding or running faces of the outer or female joint half are positioned on narrow lands, running in the axial direction of the joint and running out or projecting radially inwardly from the floor of the groove, in which the roller in question is placed.

The guiding or controlling part placed in the middle of the joint and acting on all three rollers at the same time may be a stiff or rigid body with an outline in the form of a circle running on a flat face of each of the rollers. As part of a more specially preferred working example of the invention this flat face is formed at the inner end of a turnpin of each of the rollers used for turning the supporting the roller in question in the inner or core universal joint half. This guiding or controlling part may be spherical or in the form of a cylindrical rolling body.

BRIEF DESCRIPTION OF THE DRAWINGS

Two possible working examples of the invention are to be seen in the figures.

FIG. 1 is a partly cutaway view from the side of a three driving roller universal joint of the invention, in which sliding of the two joint halves in relation to each other in the axial direction is possible, the joint being viewed in the in-line position of the two joint halves.

FIG. 2 is a partly cutaway view or part lengthways section of the system of FIG. 1 with, however, the two joint halves out of line.

FIG. 3 is a cross-section through the structure of FIG. 1.

FIG. 4 is a section through the structure of FIG. 2 taken at an angle to a normal to the axis.

FIG. 5 is a partly cutaway view through a three driving roller universal joint of the invention in the form in which the male part is locked within the female or outer part, the two joint halves being viewed when out of line.

FIG. 6 is partial side view of the structure of FIG. 2.

DETAILED DESCRIPTION

The outer or female joint half 1 (in the first working example) and 24 (in the second working example) has three grooves 11 with an equal spacing between them and which are parallel to the axis. Such grooves take up the heads of the three rollers 3 used for transmitting force or torque. The rollers 3 have turnpins such that they may be turned and moved radially. The turnpins are positioned within the inner or male joint half 2 or core. The inner ends of the rollers 3 take the form of flat faces 20, while the outer ends of the rollers take the form of controlling or running faces 5 which are all centered at 14 at the middle of the joint when the two joint halves are in line with each other, that is to say in the "stretched-out" position of two joint halves. The spherical guiding or control face 5 will be seen to be resting against an opposite guiding face 10 (in FIG. 1 etc.) or 17 (in the case of FIG. 5), such guiding face being on the top of a narrow land 4 (or 16 in the case of FIG. 5) running in the lengthways direction and running or projecting out from the floor 6 of groove 11. That is, the narrow lands are straight and extend at a right angle to a plane perpendicular to an axis of rotation of the female joint half 1. For forming a universal joint in which the male part may be moved into and out of the female joint half, the opposite guiding face 10 is straight and parallel to the joint's axis while, for forming a joint in which the male half is locked and keyed within the female half, the opposite guiding face 17 is curved in the form of a circle. The guiding part 19 placed floatingly at the middle of the joint so as to be acting on all three rollers at the same time is in the form of a stiff body whose outline takes the form of a circle and which may be in the form of a sphere or ball or in the form of a cylindrical rolling body.

This new system for positively positioning and controlling the rollers, in a way unparalleled in the prior art, makes certain of the spherical guiding or running face 5 being kept at all times evenly against the opposite guiding face 10 (or in the other case 17) and for this reason makes certain of an even or constant velocity, when the two joint halves go into a position out of line, in a simple and trouble-free way because flat faces 20 are kept equidistant from each other at all out-of-line angles even although, on going into an out-of-line position the faces are moved different amounts in relation to the middle of the joint. Because of this equidistant spacing, which is produced by the special form of the running faces of the three rollers 3, the preferred form of the invention is so designed that the cross-section of the guiding part 19 is, for machining reasons, round and in the form a circle, even although, when looked at purely from the point of view of its scientific function, the controlling or driving part 19 might be made three-, or six-sided. However machining it as a structure with a many-sided outline would be much higher in price.

The great out-of-line angle 18 of the joint, in which the two halves are locked together (FIG. 5), which in a front wheel drive system for motor vehicles may go up to a value as high as 47°, is responsible for one of the three rollers 3 being so moved that at the open end of the outer or female joint half 24 the rolling face 21 will come out of groove 11 to a small degree; however at this point in time the flow of power will not be stopped, even although there is a loss of support against the sides of groove 11, and in fact the flow of power will only be made to take a different path, because of the positive guiding system, for the reason that the spherical guiding face 5 of roller 3 is kept against the circular opposite guiding face 17 (because of the rigid body of the controlling part 19) and the roller will be rigidly supported in this position. At the time of changing the path of the flow of force using the positive guiding system the two other rollers, transmitting the torque, will be fully kept against the sides of their grooves 11.

As may be seen from FIG. 6, on moving the three roller joint halves out of line, the middle 23 of groove 11 and the lengthways axis 22 of the roller 3 in question will be crossing over so that the circular running face 21 of the rollers 3 has to be curved in the length direction of the rollers as well. For keeping contact pressure as low as possible, the radius 15 of the curved face is greater than the diameter of the circular running face 21 so that, with an increase in the out-of-line angle 12 (or 18), the play between the side of the groove 11 and the rolling or running face 21 of the separate rollers 3 will become smaller, this decreasing the noise level produced by the joint. This crossing over of the axes 22 and 23 to be seen in FIG. 6 is the reason for making the land 4 (or 16) and the opposite guiding face 10 (or 17) thereon vary narrow. Because of this low breadth of the land, on milling the circular opposite guiding face 17 only a very small amount of metal has to be run off.

The degree to which the positive controlling or guiding system of the present invention is responsible for a decrease in radial motion of the three rollers in relation to the inner male half or core in comparison with present-day, that is to say prior art three-roller joints, will readily be seen by the reader from the small difference between the sizes 8 and 9 by reason of the out-of-line angle of 30° to be seen in FIG. 2, which difference is very much smaller than the values possible with present-day designs. Because the oscillating motion of the inner or core joint half is representatively decreased, the joint is much quieter and has much smoother running properties, in comparison with present-day three-roller joints which, in all cases, have a tendency towards vibration.

Three-roller joints with a positive guiding system of the present invention have a specially small overall size and because of the great difference between the thin turnpins of the three rollers and the great diameter of their rolling or running faces 21, there are only low friction losses so that even although the invention makes use of a plain bearing system (which is very much cheaper to make and is more trouble-free in operation than needle bearing system needed for prior art designs) a high efficiency is made possible. Because the grooves 11 of the outer joint half 1 (or 24 in the second case) may be broached because they are straight and parallel to the axis (even in the case of the joint of FIG. 5 in which the male part is locked within the female one) if, as is frequently done at the present time, the female joint half is joined to its shaft connection by friction-welding, the price of making such a joint is very much lower than in the case of present-day, that is to say prior art three-roller joints.

A further useful effect, for which the three-roller joints of the invention with positive control or confining of the system as in the present invention are responsible, is lastly to be seen that not only in the case of a joint in which the male part is locked within the female one, but furthermore when it may be slipped in and out of the female part to a marked degree, the same inner or core joint halves may be used which have the same rollers and the same controlling or guiding parts. For this reason production costs will be decreased because of the longer production runs while furthermore, the fact that some of the joint parts are the same will have a desired effect in connection with repairs and warehousing in the international automobile industry.

The embodiments of the invention in which an exclusive property or privilege is claimed are defined as follows:

1. In a universal joint with a female outer part having three equidistantly spaced grooves therein and a male inner part having a core, three rollers each seated within a one of said three grooves in said female part and turningly joined to said core, and means for causing radial motion of said rollers in relation to said core by way of first guiding faces on said rollers, such first guiding faces being kept against second guiding faces on the floors of said grooves by a driving part placed at the middle of said joint for acting on all three rollers at the same time, and such radial motion of said rollers being designed for equal speeds of turning of said male and female joint parts, the improvement comprising wherein
   (a) said first guiding faces on said rollers are each a surface segment of a sphere, the entire surface portion of each segment having a center located at the center of said joint when the axes of turning of said male and female parts are in line, and
   (b) said second guiding faces are each a surface segment of a sphere provided on radially inwardly facing narrow lands which extend in the direction of the axis of turning of said female part and project radially inwardly from said floors of said grooves to slidingly engage said first spherical guiding faces on said rollers.

2. The universal joint as claimed in claim 1 wherein the said driving part at the middle of the said joint acting on all three rollers at the same time is in the form of rigid body with a circular outline acting on flat faces of said rollers.

3. The universal joint as claimed in claim 2 wherein said flat faces are at inner ends of turnpins forming parts of said rollers and bearingly supporting said rollers in said core.

4. The universal joint as claimed in claim 3 wherein said driving part is spherical.

5. The universal joint as claimed in claim 3 wherein said driving part takes the form of a cylindrical rolling body.

6. The universal joint as claimed in claim 1, wherein said first guiding faces have a width generally equal to the width of said grooves.

7. The universal joint as claimed in claim 6, wherein said surface segments are each circularly shaped, the side edges thereof engaging the sides of a said groove while said surface segment simultaneously engages said second guiding face, thereby making the diameter of said circular shape generally equal to said width of said groove.

8. The universal joint as claimed in claim 1, wherein said narrow lands are straight and extend at a right angle to a plane perpendicular to an axis of rotation of said female part.

* * * * *